J. M. KROYER.
FRICTION CLUTCH.
APPLICATION FILED JUNE 14, 1909.
943,977.
Patented Dec. 21, 1909.
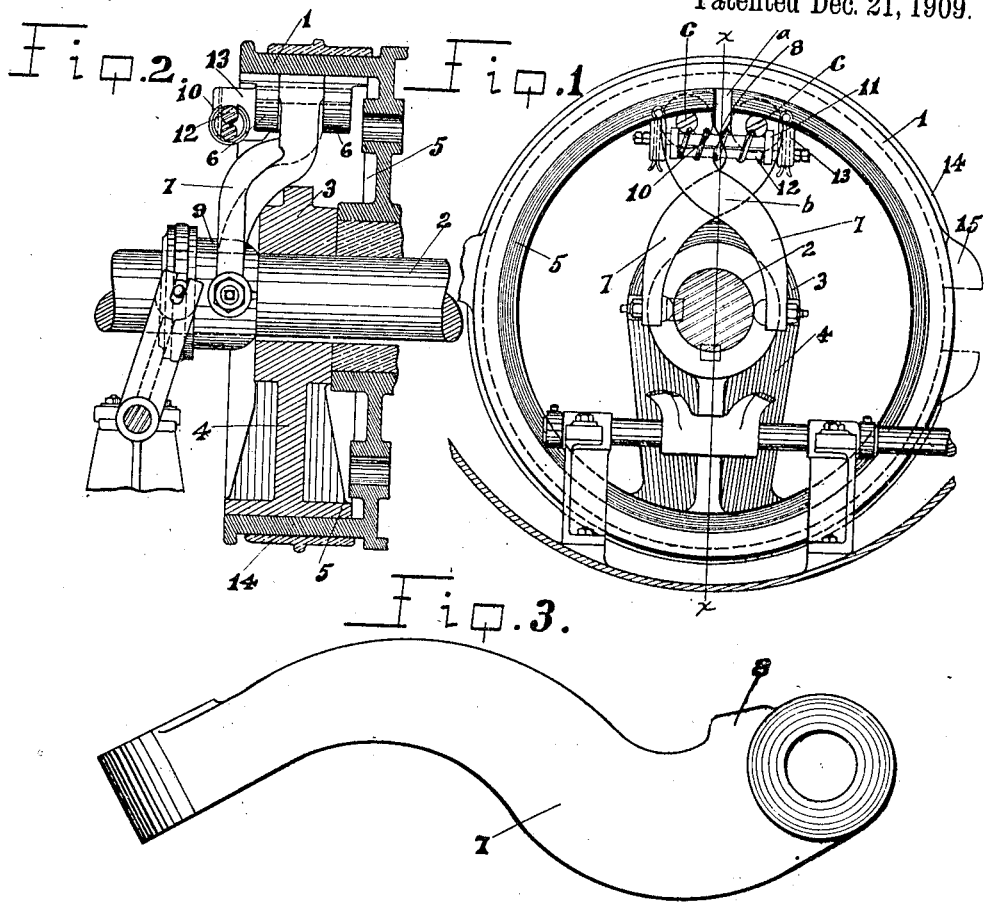

UNITED STATES PATENT OFFICE.

JOHN M. KROYER, OF STOCKTON, CALIFORNIA, ASSIGNOR TO SAMSON IRON WORKS, OF STOCKTON, CALIFORNIA, A CORPORATION.

FRICTION-CLUTCH.

943,977. Specification of Letters Patent. Patented Dec. 21, 1909.

Application filed June 14, 1909. Serial No. 502,029.

*To all whom it may concern:*

Be it known that I, JOHN M. KROYER, a citizen of the United States, residing at Stockton, in the county of San Joaquin, State of California, have invented certain new and useful Improvements in Friction-Clutches; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in clutches for driving means and particularly to friction clutches known as the friction ring type, the object of the invention being to produce a clutch in which the direct forward clutch ring is expanded by driving the free ends of the same upward and outward instead of downward and outward, and thus the friction is entirely even throughout the entire periphery of the friction ring and there is no danger of the ends becoming bent or worn and also a greater and better friction surface is presented to the main driving drum.

A further object of the invention is to produce such a friction clutch as will be simple of construction and yet highly efficient for the purposes for which it is designed.

These objects I accomplish by means of the usual friction drum having within its inner periphery a friction ring split at one point, there being depending lugs at each end of said ring to which are pivoted friction dogs, such friction dogs crossing each other and having a mutual contact point at a point in a lower plane than the plane of the centers of their pivotal points on said lugs, whereby when said lugs are expanded at their lower ends by the shifting ring, their upper ends will move said friction ring first outward and then, by reason of said contact points, upward against the said friction drum and thus the contact between said friction drum and ring will have an even and uniform effect, thus giving a greater degree of resisting power, since in most internal clutches, the open ends of the friction ring are moved downward and outward instead of upward and outward as in mine, and hence such ends are liable to become bent or worn at their moving points and thus render the clutch ineffective while in mine, the ring at all times maintains a complete circular form giving no point of wear save on the entire surface of the same.

I also employ such other and further structure and relative arrangement of parts as will more fully appear by a perusal of the following specification and claims.

In the drawings similar characters of reference indicate corresponding parts in the several views.

Figure 1 is a front elevation of a friction drum showing my improved forward drive friction ring installed therein. Fig. 2 is a sectional view taken on a line $x$—$x$ of Fig. 1, with the shifting cam not shown. Fig. 3 is a front elevation of a friction dog.

Referring now more particularly to the characters of reference on the drawings 1 designates the friction drum which may be driven by the usual planetary or other driving means but for the purposes of this description, I will presume the same to be of the planetary type.

2 is the transmission shaft, keyed to which is a sleeve 3 having an arm 4 on which is formed, as a part thereof, the direct drive friction ring 5 which ring is but one continuous member split at one point "$a$" instead of at two points as in the usual form of friction clutch.

At each end of the ring 5 are depending lugs 6 pivoted to which are the friction dogs 7, such dogs crossing each other as at "$b$", such dogs having mutual contacting surfaces 8 at a point below the plane of the pivotal points "$c$" of said dogs 7 and said lugs 6, whereby when the dogs 7 are spread apart by the shifting cam 9, the surfaces 8 impinge one against the other and this, instead of driving the friction rings outward and pulling the free ends of the same downward, drives said free ends upward and outward, thus giving a greater, better and more powerful friction contact between the friction ring and drum than is the case where such free ends are bent downward and outward.

10 is a spring interposed between shoulders 11 on pins 12, said pins being secured to lugs 13 on the ring 5 whereby when the cam 9 is released from the dogs 7 said spring acts to release said ring 5 from contact with the drum 1.

The type of clutch shown being the usual planetary type, the band 14 is the usual band used to hold the drum stationary while the internal gear of the clutch perform their operation in the usual manner to give a reverse operation. This mechanism is old and well known hence I have not here shown it in detail.

From the foregoing description it will be readily seen that I have produced such a friction clutch as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A friction clutch comprising a friction drum, an internal friction ring split at one point, levers fulcrumed to the free ends of said ring and crossing each other, a lug on the inner side of each lever, such lugs being opposed and normally impinging one upon the other in a plane lower than the pivotal points of said levers and said ring.

2. A friction clutch comprising a friction drum, an internal friction ring split at one point and levers pivoted to the free ends of said ring, said levers having mutual contact points in a plane lower than the plane of the pivotal points of said levers and said ring, said levers crossing each other at a point below said contact points, as described.

In testimony whereof I affix my signature in presence of two witnesses.

JOHN M. KROYER.

Witnesses:
 PERCY S. WEBSTER,
 WM. B. GRIFFIN.